(12) United States Patent  
Bailey, Jr. et al.

(10) Patent No.: US 9,076,013 B1  
(45) Date of Patent: Jul. 7, 2015

(54) MANAGING REQUESTS FOR SECURITY SERVICES

(75) Inventors: Donald L. Bailey, Jr., Penn Laird, VA (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 633 days.

(21) Appl. No.: 13/037,265

(22) Filed: Feb. 28, 2011

(51) Int. Cl.
 *G06F 11/00* (2006.01)
 *G06F 21/62* (2013.01)
 *H04L 29/06* (2006.01)
 *H04W 12/06* (2009.01)

(52) U.S. Cl.
 CPC ........ *G06F 21/6227* (2013.01); *H04L 63/1433* (2013.01); *H04W 12/06* (2013.01)

(58) Field of Classification Search
 None
 See application file for complete search history.

(56) References Cited

U.S. PATENT DOCUMENTS

| | | | | |
|---|---|---|---|---|
| 2001/0034847 | A1* | 10/2001 | Gaul, Jr. ...................... | 713/201 |
| 2010/0115622 | A1* | 5/2010 | Amoroso et al. ............... | 726/25 |
| 2010/0125899 | A1* | 5/2010 | Tinnakornsrisuphap et al. ............... | 726/12 |
| 2011/0213875 | A1* | 9/2011 | Ferris et al. .................... | 709/224 |

OTHER PUBLICATIONS

McAffe, Business Brief, "McAfee Cloud Security Platform," Copyrighted 2011.

Symantec, "Infrastructure," http://www.symantec.com/business/theme.jsp?themeid=symantec-cloud, retrieved May 25, 2011.

Dell SecureWorks, "iSensor," http://www.secureworks.com/services/advantage/isensor/, retrieved May 25, 2011.

Qualys, "The QualysGaurd® IT Security + Compliance Suite," http://www.qualys.com/products/qg_suite/, retrieved May 25, 2011.

* cited by examiner

*Primary Examiner* — Jeffrey Pwu
*Assistant Examiner* — Nega Woldemariam
(74) *Attorney, Agent, or Firm* — Knobbe, Martens, Olson & Bear, LLP

(57) ABSTRACT

Embodiments of systems and methods are described for managing requests for security services to a provider of computing resources. In some implementations, a user can request that security services be provided to analyze or test a target network. For example, the user can request that security services conduct penetration testing of the target network in order to detect vulnerabilities with the target network's security infrastructure or configuration. The computing resource provider can dynamically provide the security services to the target network, for example, by instantiating one or more virtual machines that begin security testing of the target network in response to the user's request. In some embodiments, the provider of the security services may instantiate a security virtual machine instance (VMI) that can be connected to a customer's network using a secure connection, such as a virtual private network. The virtual machine instance can be physically located outside the customer's network while functioning as part of the customer's network. Thus, the security VMI can test security from either outside the network or from inside the network. In some embodiments, the VMI may test at multiple locations of the customer's network, for example, by establishing connections to multiple locations on the customer network.

33 Claims, 4 Drawing Sheets

MANAGING REQUESTS FOR SECURITY SERVICES

BACKGROUND

Companies and organizations operate computer networks that interconnect numerous computing systems to support their operations. The computing systems can be located in a single geographical location (e.g., as part of a local network) or located in multiple distinct geographical locations (e.g., connected via one or more private or public intermediate networks). Data centers may house significant numbers of interconnected computing systems, such as, e.g., private data centers are operated by a single organization and public data centers operated by third parties to provide computing resources to customers. Public and private data centers may provide network access, power, hardware resources (e.g., computing and storage), and secure installation facilities for hardware owned by the data center, an organization, or by other customers.

To facilitate increased utilization of data center resources, virtualization technologies may allow a single physical computing machine to host one or more instances of virtual machines that appear and operate as independent computer machines to a connected computer user. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

As the scale and scope of data centers have increased, the task of provisioning, administering, and managing the physical and virtual computing resources of the data center has become increasingly complicated.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Embodiments of systems and methods are described for managing requests for computing resources from a provider of computing resources. Illustratively, the computing resources may include program execution capabilities, data storage or management capabilities, network bandwidth, or the like. In some implementations, a user can request that security services be provided to analyze or test a target network. For example, the user can request that security services conduct penetration testing of the target network in order to detect vulnerabilities with the target network's security infrastructure or configuration. The computing resource provider can dynamically provide the security services to the target network, for example, by instantiating one or more virtual machines that begin security testing of the target network in response to the user's request.

In certain implementations, the provider of the security services may instantiate a security virtual machine instance (VMI) that can be connected to a customer's network using a secure connection, such as, e.g., a virtual private network (VPN), Internet Protocol Security (IPsec), Layer 2 Tunneling Protocol (L2TP), Point-to-Point Tunneling Protocol (PPTP), other network tunneling protocols, or the like. The security VMI can be physically located outside the customer's network while functioning as part of the customer's network. Thus, the security VMI can test security from either outside the network or from inside the network (e.g., though the VPN). In some embodiments, the VMI may test at multiple locations of the customer's network, for example, by establishing connections to multiple locations on the customer network. Compared to installing security services software on the customer's network and configuration of that software, dynamic provisioning of security services may provide enhanced responsiveness, rapid deployment, dynamic testing of locations, as well as lower deployment costs.

Various aspects of the disclosure will now be described with regard to certain examples and embodiments, which are intended to illustrate but not to limit the disclosure.

Figure 1:
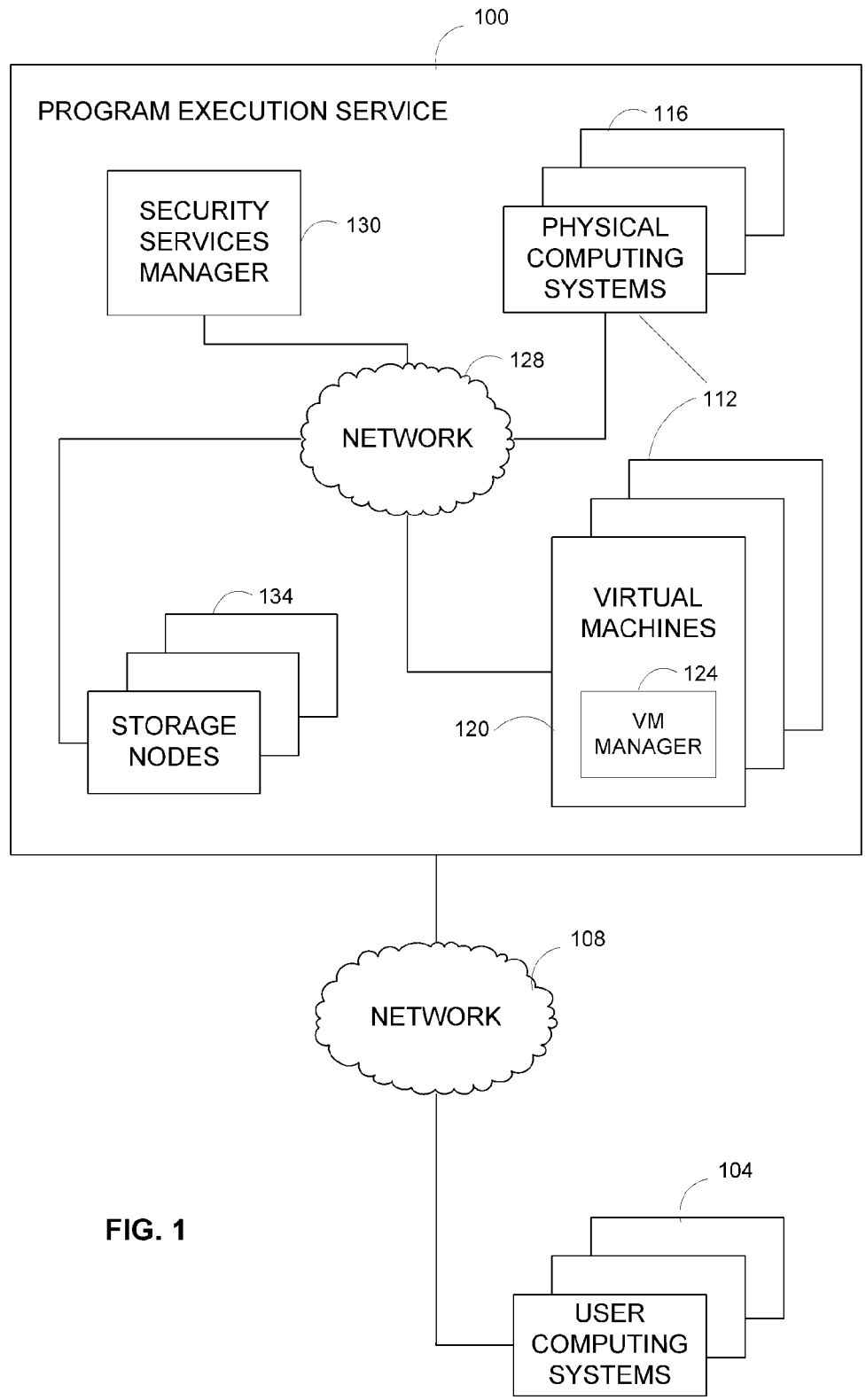
FIG. 1 is a network diagram schematically illustrating an example of a program execution service that can provide security services or other computing resources to multiple user computing systems via a communication network.

FIG. 1 is a network diagram schematically illustrating an example of a program execution service 100 that can provide security services or other computing resources to multiple user computing systems 104 via a communication network 108. For example, the program execution service 100 can manage requests from a user to execute a program, or set of programs (e.g., security testing programs), on behalf of the user. At least some of the user computing systems 104 may be remote from the program execution service 100. In this example, users can use the computing systems 104 to access the program execution service 100 over the communication network 108. The network 108 may, for example, be a publicly accessible network of linked networks, possibly operated by various distinct parties, such as the Internet. In other embodiments, the network 108 may be a private network, such as, for example, a corporate or university network that is wholly or partially inaccessible to non-privileged users. In still other embodiments, the network 108 may include one or more private networks with access to and/or from the Internet.

The security services provided by the program execution service 100 can include active evaluation of a target network's information security measures. Such evaluations can be used to identify vulnerabilities or operational weaknesses of the target network, prevent or reduce financial loss through fraud or lost revenue due to unreliable business systems (e.g., unavailable web services or retail front-end), and/or provide auditing, due diligence or compliance with industry best practices or regulations. Testing can include evaluations of the security of one or more of operating systems, applications, databases, networking equipment, web sites, web services, network connections, remote access, wireless access, password strength, or the like.

The program execution service 100 provides a variety of functionality for managing execution of security services for multiple users. In the example illustrated in FIG. 1, the program execution service 100 comprises a plurality of computing nodes 112 that can execute programs on behalf of the users. The computing nodes 112 may comprise one or more physical computing systems 116 and/or one or more virtual machines instances 120 that are hosted on one or more physical computing systems. For example, a host computing system may provide multiple virtual machines instances 120 and include a virtual machine ("VM") manager 124 to manage those virtual machines (e.g., a hypervisor or other virtual machine monitor).

In the example illustrated in FIG. 1, each of the computing nodes 112 has some amount of computing resources available for executing one or more programs. Each computing node 112 may be configured to provide a specific amount of program execution capacity, which may be measured, for example, by a combination of one or more of processing capacity (e.g., number and/or size of processing units), memory capacity, storage capacity, network bandwidth capacity, non-network communication bandwidth, etc. In some embodiments, the program execution service 100 may provide preconfigured computing nodes 112, with each preconfigured computing node having one or more programs. The preconfigured computing nodes 112 may be instantiated from an image of an operating system including the one or more programs. For example, the computing node 112 may be preconfigured with security programs, network penetration programs, network diagnostics programs, or the like, to allow the computing node to analyze network security. In some embodiments, different computing nodes may include programs from different providers. Thus, a customer can try out different programs from different providers by requesting different types of computing nodes. In some embodiments, the computing nodes 112 may have varying amounts and/or types of computing resources (e.g., size, speed and/or type of processing units; number of processing units; available bandwidth connection; amount of memory and/or storage; platform configuration, such as 32-bit or 64-bit, operating system, etc.).

The program execution service 100 may provide user computing systems 104 with access to storage nodes 134 that provide mass storage of data, programs, and other user information. The storage nodes 134 may comprise any type of persistent data storage, for example non-volatile memory devices such as, e.g., hard disk drives, optical disk drives, etc. In the example illustrated in FIG. 1, the computing nodes 112 can access the storage nodes 134 via a network 128. The network 128 may include multiple networking devices (not shown) such as, e.g., switches, edge routers, core routers, etc. The network 128 may, but need not be, a different network than the network 108 shown in FIG. 1.

Users of the program execution service 100 can interact with the program execution service 100 via a security services manager 130 to request desired security services from the program execution service (e.g., penetration testing and/or network analysis). The security services manager 130 can be connected to the computing nodes 112 and the storage nodes 134 via the network 128. The security services manager 130 can receive requests for security services from the user computing systems 104 over the network 108. A user may request via the security services manager 130 that the service 100 provide one or more security services on behalf of the user (or other users authorized by the user) for the user's network. In some embodiments, the security services manager 130 may provide subscription and/or registration services to one or more users, such that users may specify information related to one or more programs to execute on behalf of a user (e.g., programs, source code, testing parameters, testing schedule, target locations, etc.), account information (e.g., user name, billing information, etc.), terms of use, etc. In some embodiments, after a user interacts with the security services manager 130 to subscribe and/or register for services, the user may be issued one or more request identifiers (e.g., keys, tokens, user names, passwords, etc.) that are associated with the user and are to be used in conjunction with executing programs on behalf of the user. In other embodiments, a module other than the security services manager 130 may be provided to perform various operations related to subscription and/or registration services of the program execution service 100.

In some embodiments, the security services manager 130 is executed or embodied by one or more physical or virtual computing systems. For example, in some embodiments, a server computing system that has components including a CPU, I/O components, storage, and memory may be used to execute the security services manager 130. The I/O components include a display, a network connection to the network 128, a computer-readable media drive, and other I/O devices (e.g., a keyboard, a mouse, speakers, etc.). An embodiment of the security services manager 130 can be stored as one or more executable program modules in the memory of the server, and the security services manager 130 can interact with computing nodes 112 (e.g., physical computing systems 116 and/or virtual machine instances 120) over the network 128. The security services manager 130 can receive requests from users for computing resources of the program execution service 100 via the network 108.

Figure 2:
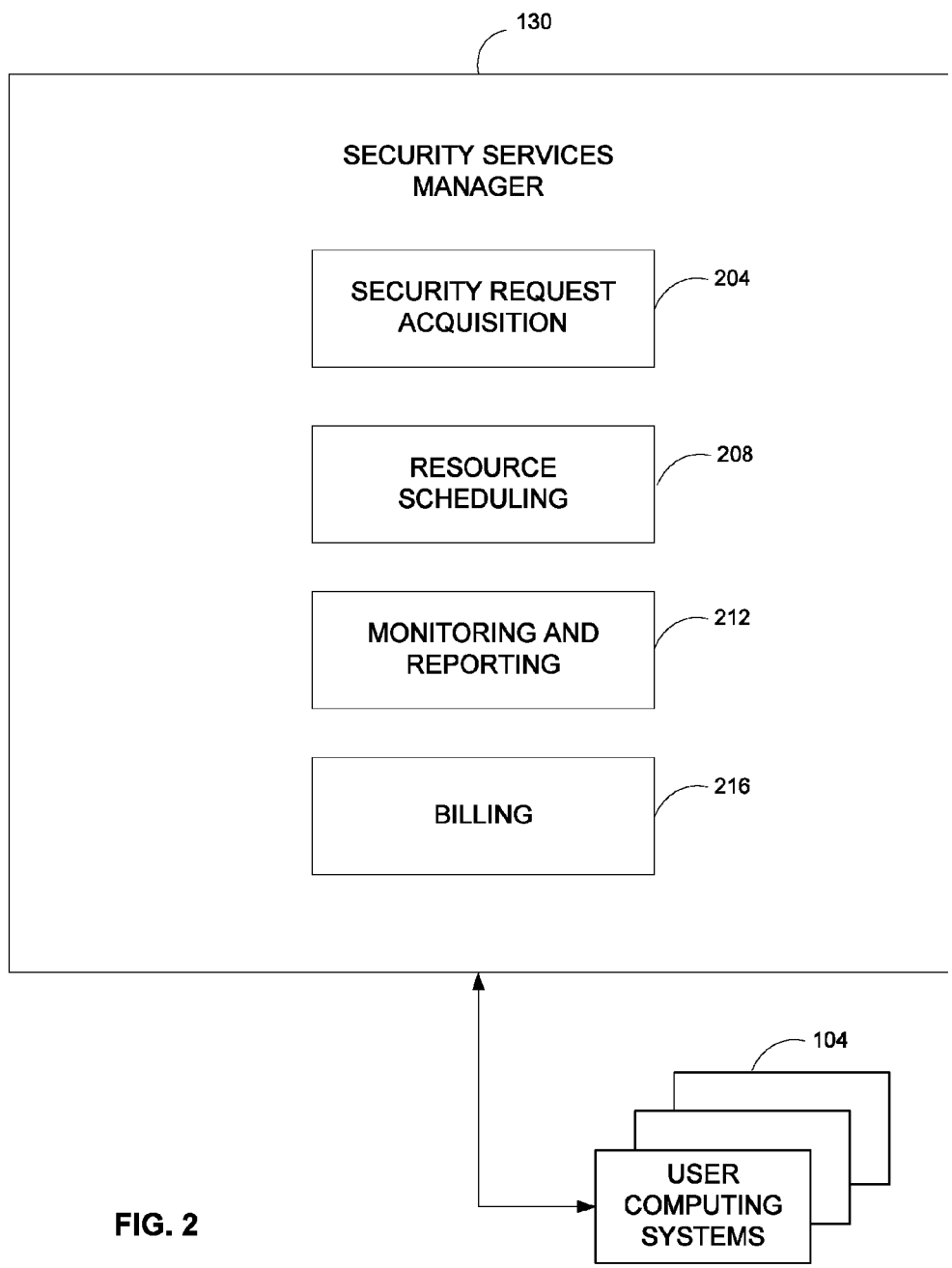
FIG. 2 is a block diagram schematic of illustrative components of an embodiment of the security services manager that is configured for managing security services requests by users of a program execution service.

FIG. 2 is a block diagram schematic of illustrative components of an embodiment of the security services manager 130 that is configured for managing security services requests on behalf of users. In this embodiment, the security services manager includes a security request acquisition module 204, a resource scheduling module 208, monitoring and reporting module 212, and billing module 216.

The security services acquisition module 204 receives or accesses requests from users for security services. Requests for security services may be received by the security services acquisition module 204 in various ways. For example, a request can be received directly from a user (e.g., via an interactive console or other GUI provided by the program execution service), from an executing program of a user that automatically initiates the execution of other programs or other instances of itself, from a program that interacts with the security services manager via an Application Programming Interface ("API") provided by the program execution service (e.g., an API that uses Web services), and so forth.

Requests for program execution may include various information to be used in the initiation of the execution of one or more programs, such as an executable or other copy of a program to be executed, a selection of programs to execute, an indication of a program that was previously registered or otherwise supplied for execution, and a number of instances of the program that are to be executed simultaneously (e.g., expressed as a single desired number of instances, as a minimum and maximum number of desired instances, etc.). The request may specify a number and/or type of computing nodes for execution of a program, a minimum and/or maximum number of computing nodes to use, an expiration time for the request, a preferred execution time and/or time period of execution, etc. The request may include other types of preferences and/or requirements for execution of one or more programs (e.g., resource allocation, geographical and/or logical location for execution, proximity of execution to other programs and/or computing nodes, timing-related criteria, termination criteria, etc.).

In some embodiments, the resource scheduling module 208 may perform one or more management operations with respect to fulfilling requests, such as, for example, enforcing usage period or other restrictions associated with requests, freeing-up computing resources to fulfill the requests, authorizing and/or authenticating the requests and/or the requesting users, etc. For example, in some cases, the request from the user may specify that only one or more specified programs be executed or that only particular locations on the customer network be tested. Other restrictions can include restrictions on duration of execution of a program, restrictions on fees incurred during execution of the program, etc. Combinations of one or more of the above restrictions (or other restrictions) may be specified by the user and checked by the security services manager 130 before providing the requested security service.

In the embodiment illustrated in FIG. 2, the monitoring and reporting module 212 monitors and tracks usage of the security computing nodes during the usage period and reports information and statistics on the usage to the user. For example, the monitoring and reporting module 212 may track usage patterns of users executing programs on the guaranteed availability computing nodes. Usage patterns can include the number or identity of users requesting security services, the start/end times and durations of security service execution, and/or other user-specified patterns or diagnostics. In some such embodiments, the monitoring and reporting module 212 may provide interactive feedback to the user including, e.g., indications of when and/or for how long programs may be likely to execute or a real-time or near real-time security status of the customer network. In some embodiments, the monitoring and reporting module 212 can generate a report detailing or summarizing the usage statistics and/or security testing results and communicate the report to the user via electronic mail or provide access to the report, usage statistics, network status, or interactive feedback via Web services.

Some program execution services 100 may be fee-based such that the service executes programs (e.g., security services) or allocates computing resources on behalf of a user in exchange for payment of one or more fees by that user. In some fee-based services, the security services manager 130 may optionally include the billing module 216 schematically illustrated in FIG. 2. For example, in some embodiments, fees may be charged to a user based on an amount and/or type of program execution capacity allocated for executing one or more programs on behalf of a user, such as based on one or more of a number of processing units, an amount of memory, an amount of storage, an amount of network resources, etc., allocated for executing programs of the user. In some embodiments, fees may be based on other factors, such as various characteristics of the computing resources used to execute programs, such as, for example, based on CPU capabilities or performance, platform type (e.g., 32-bit, 64-bit, etc.), etc. In some embodiments, fees may be charged on the basis of a variety of use factors, such as a price per use of the service, a price per unit of time that computing services are used, a price per storage used, a price per data transferred in and/or out, etc.

Fees may be based on various other factors, such as related to the types of security services requested, the selected security programs to execute, and/or various properties related to executing programs (e.g., continuity of execution, fault tolerance, frequency of testing or monitoring, etc.). In at least some embodiments, a program execution service may offer one or more of various tiers, types and/or levels of services or functionality for executing security services, and in some such embodiments, various fees may be associated with the various tiers, types and/or levels of services. The billing module 216 can monitor and track usage of the computer resources and calculate fees due for the usage.

The user may be charged a fixed fee payment (e.g., upfront or periodically billed) for security services and, in some cases, is charged other use fees (e.g., variable fees associated with use of various resources, such as electricity, physical rack space, network utilization, etc.). As an example, a user may request daily, weekly or monthly monitoring or testing of the customer network, and the user may be charged higher fees based on the frequency. As discussed above, various types or tiers of fee arrangements are possible.

The billing module 216 may meter or track the usage, calculate appropriate fees, rate or calculate charges incurred by a user, and bill the user and/or the authorized user (or provide billing information to an accounting module or service). In some embodiments, the user's usage of the security service is rated and used, at least in part, to determine how much to bill the user. This allows users to "pay as they go," where the user is charged for use of the security services rather than for purchase of software or hardware. Billing the user may based on dynamically metered usage, wherein an amount of usage determines, at least in part, an amount billed to the user. As a result, the entry costs for the users to receive security services may be significantly lower than if the user were to purchase security software or hardware. In some cases, the request by the user may indicate that some or all of the usage fees incurred by authorized users be billed to the user rather than to the authorized users. In some such cases, the billing module 216 may appropriately apportion the fees among the user and authorized users. The billing module 216 may distribute the fees to the provider of the security program being used. A portion of the fees may be retained by the program execution service 100 provider.

The security services manager 130 can be configured differently than illustrated in FIG. 2. For example, various functionalities provided by the illustrated modules can be combined, rearranged, added, or deleted. In some embodiments, additional or different processors or modules may perform some or all of the functionalities described with reference to the example embodiment illustrated in FIG. 2. Many implementation variations are possible.

Although described generally in terms of providing security services, in other embodiments, the security services manager 130 can be configured to manage additional or alternative types of computing-related resources. These resources may include one or more of the following: persistent data storage capabilities (e.g., on non-volatile memory devices, such as hard disk drives); temporary data storage capabilities (e.g., on volatile memory, such as RAM); message queuing and/or passing capabilities; other types of communication capabilities (e.g., network sockets, virtual communication circuits, etc.); database management capabilities; dedicated bandwidth or other network-related resources; non-network bandwidth; input device capabilities; output device capabilities; CPU cycles or other instruction execution capabilities; etc.

Figure 3:
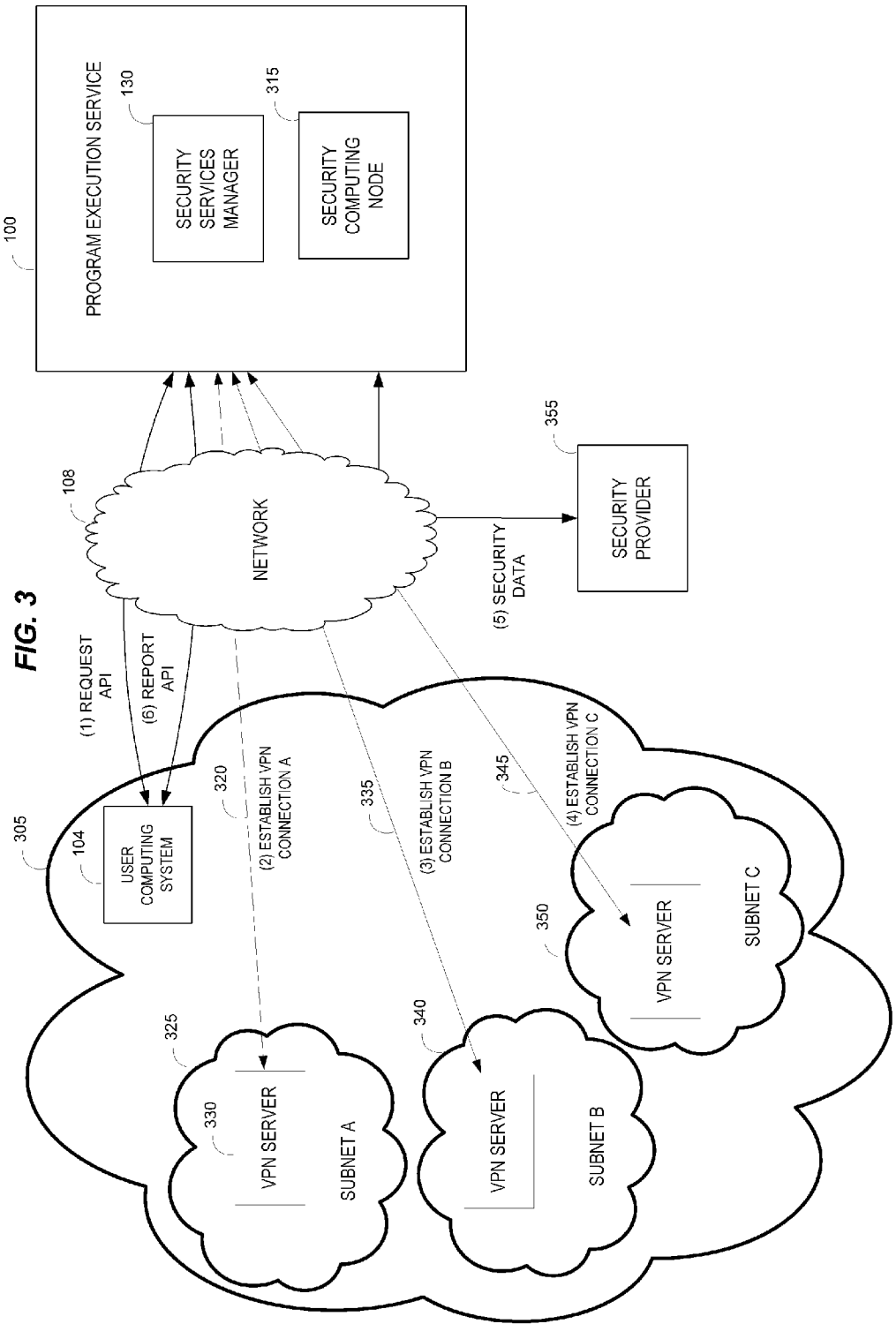
FIG. 3 schematically illustrates a block diagram of an embodiment of a program execution service that provides security services to a customer network.

FIG. 3 schematically illustrates a block diagram of an embodiment of a program execution service 100 that provides security services to a customer network 305. A user (e.g., network administrator) requests security services through a user computing system 104 via a (1) Request API of the program execution service 100. The request can be sent over a network 108, such as the Internet and received by the security services manager 130. While connections between the illustrated components in FIG. 3 are indicated using bi-directional arrows, communications between components may be either unidirectional or bi-directional. When the security services manager 130 receives the request, it can allocate a security computing node 315 (e.g., by instantiating a virtual machine instance operating on a computing system) for providing security services to the customer network 305.

The security services manager 130 can include or control one or more security computing nodes 315. The security services manager can programmatically instantiate or allocate the security computing node 315 based on the request, including any parameters associated with the request. In some embodiments, the security computing node 315 begins providing security services to the customer network 305 with no further user intervention needed. Thus, in some embodiments, the security services can be provided automatically after being requested by the user. For example, the security computing node 315 can be preconfigured to perform one or more operations or tests requested by the user so that the security computing node 315 can be operated by the program execution service 100 without further user input. In one embodiment, the security computing node 315 can be operated periodically or at subsequent times in the future without further user action. For example, the security computing node 315 may be configured to monitor and/or test the customer network 305 at set times or intervals.

In the illustrated embodiment, the security computing node 315 or security services manager 130 (2) establishes a VPN connection 320, a secure connection, or other type of connection to Subnet A 325 (or other type of location) on the customer network 305. In one embodiment, the security computing node 315 connects with a VPN server 330 on Subnet A. By using a VPN or other secure connection 320, the security computing node 315 can operate as if it were logically inside the network. For example, the security computing node 315 can be associated with an IP address in the same address range as that of Subnet A and have the same or substantially similar network access as a computing system located within the target network. In one embodiment, the security services manager 130 connects to a network monitoring devices located at one or more locations of the customer network 305. The network monitoring device may be a hardware device or specialized networking hardware that was pre-deployed at the customer network 305. The network monitoring device may execute network tests on the customer network in order to generate network security data and may be directed by the security services manager 130. In some situations, the security computing node 315 may be able to bypass firewalls or other filtering systems by using the secure connection. Thus, by using a VPN connection, the security computing node 315 can obtain greater network access than a computing system accessing the target or customer network 305 outside the network without a secure connection.

In some embodiments, the security services manager 130 may direct the security computing node 315 to (3), (4) establish VPN connections 335, 345 to one or more additional locations on the network 305 (e.g., Subnet B 340 and/or Subnet C 350 in the example shown in FIG. 3). Thus, one security computing node 315 can connect to multiple locations on the customer network 305 and analyze or test the network from those multiple locations. This can provide a more thorough testing of the customer network. For example, one subnet may be operating software that presents a security vulnerability and by testing at multiple points, the security computing node 315 is more likely to detect the vulnerable subnet. Another possible benefit is that the security computing node 315 may be able to collect data from multiple points on the customer network 305, thereby allowing more complete testing of the network. Such testing may allow detection of security vulnerabilities that might not be evident from testing at a single location. In some embodiments, the security services manager 130 can instantiate or allocate several security computing nodes 315 in order to provide concurrent testing of the multiple locations or to otherwise scale the testing. The security services manager 130 may dynamically scale the number of instantiated or allocated computing nodes based on the needs of the security test, network size, desired performance, frequency of testing, the user request, or the like.

In an embodiment, the security services manager 130 may communicate (5) security data to one or more security providers 355. The security data can be communicated over the network 108 and the security data can include a security status report having information related to vulnerabilities discovered during testing. The security provider 355 may further analyze the data, determine additional tests to run, provide manual review of the data with security personnel, or the like. The security provider may then communicate its results to the security service manager 130, the user computing system 104, or another destination. The security provider 355 may operate as part of the program execution service 100 or may be an outside entity.

In some embodiments, the monitoring and reporting module 212 can generate a report detailing or summarizing the usage statistics and/or security testing results and communicate the report to the user via a (6) reporting API that provides access to the report, usage statistics, network status, or interactive feedback. For example, the monitoring and reporting module 212 can provide the report through electronic mail, texts, or Web services.

Figure 4:
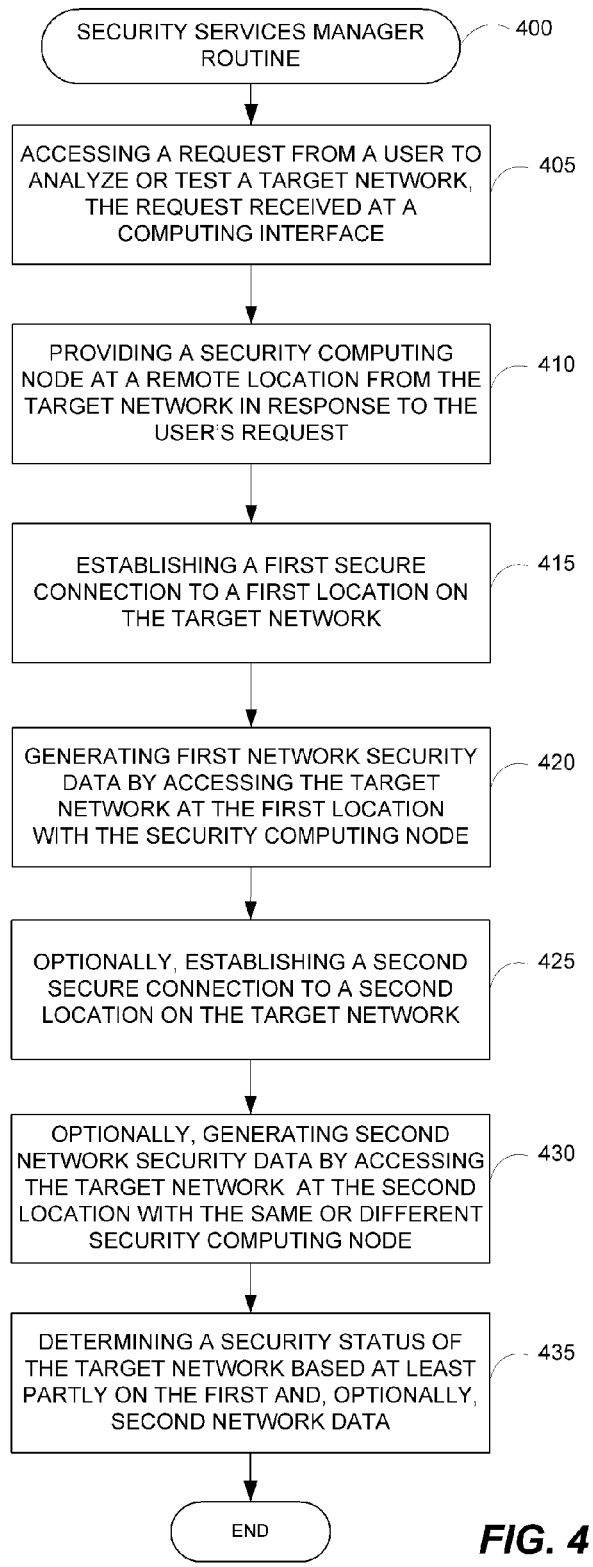
FIG. 4 schematically illustrates a flow diagram of an embodiment of a security services manager routine for providing security services to the customer network.

FIG. 4 schematically illustrates a flow diagram of an embodiment of a security services manager routine 400. In some implementations, the routine 400 can be provided by embodiments of the security services manager 130 of the program execution service 100 described with reference to FIGS. 1 and 2. In some embodiments, the routine 400 can be provided by the program execution service 100 or one of its components, such a computing node or virtual machine. For ease of explanation, the following describes the routine 400 as performed by the security services manager 130. The example routine 400 is intended to illustrate, but not to limit, various aspects of the security services manager 130.

Beginning at block 405, the security services manager 130 accesses a request from a user to analyze or test a target network. The request can be received by the security services manager 130 at a computing interface, such as an API, Web services, or console. The request may be received and processed in substantially real-time or may have been stored for a period of time. For example, the requests may be queued for some time and processed once security testing resources become available. Requests may also be stored for scheduled security testing if the customer desires periodic testing or future testing. In another example, requests may be processed in substantially real-time if resources are available or immediate processing is desired. The request may be received from a computing system 104 over the network 108. As discussed above, the request for security services may include a number and/or type of computing nodes, a minimum and/or maximum number of computing nodes to use, a scheduled usage period, an expiration time for the request, security testing parameters, testing locations, a selection of security programs, a selection of tests to execute, network configuration data, etc. The request may specify multiple locations on the target network for testing. For example, the request can identify multiple computing systems through IP addresses or multiple address ranges for testing. The request for security services may include other types of preferences, requirements, and/or restrictions (e.g., amount of network bandwidth, geographical and/or logical location for the computing nodes, termination criteria, etc.). The request may provide information on the target network, such as network diagrams or IP addressing information, to facilitate testing of the target network (e.g., white box testing), though testing can also be conducted with little or no knowledge of the internal infrastructure of the target network (e.g., black box or grey box testing).

The security services manager 130 may provide confirmation that the request can be fulfilled to the user. For example, a message may be communicated to the first user via electronic mail, or the program execution service may provide the confirmation via Web services or via an interactive console or other GUI provided by the program execution service 100. The confirmation may be provided via a confirmation API.

At block 410, the security services manager 130 provides a computing node at a remote geographic location from the target network (e.g., at the program execution service 100) in response to the user's request. The security computing node may be provided dynamically to the user. For example, the program execution service 100 may automatically instantiate a security computing node on a data center with preconfigured security services software (e.g. penetration test programs, network monitoring programs, or the like) in response to the request. This can allow rapid deployment of security services to the customers as setup can happen programmatically and outside of the customer's network. Thus, configuration changes to the target may be unnecessary. Compared to installing security services software on the target network and configuration of that software, the above approach can provide enhanced responsiveness as well as lower deployment costs in some implementations.

In another embodiment, the security services may be provided in a persistent manner to the user. This can allow state or data from one test to be carried into the next test. For example, the security computing node can be saved as a virtual machine image and the computing node instantiated from the image at a later time. In some embodiments, the security computing node may be suspended between tests, to reduce resource usage. The security computing node may be associated with an identifier so that the security services manager 130 can identify which node is associated with a particular target network. In one embodiment, the security services manager 130 can periodically activate the security computing node to perform additional testing.

At block 415, the security services manager 130 establishes a first secure connection from the security computing node to a first location on the target network. In one embodiment, the secure connection is to a VPN server on the target network to form a virtual private network between the security computing node and the target network. Data transmitted between the VPN server and the security computing node can be encapsulated so as to keep the transferred data private from other devices on one or more intervening local or wide area networks. The VPN server may authenticate the connection through passwords, digital certificates, or the like, before establishing the connection. The secure connection can provide the security computing node with the same or substantially similar access to the target network as a computing system physically located on the target network. Security tests performed from inside the network can provide additional data or reveal addition vulnerabilities that would not otherwise be apparent from outside testing. For example, many networks have firewalls or other filtering mechanisms separating publicly accessible portions of the network from private sections. In another example, some networks have internal Web services or other computing resources (e.g., an internal company web page) that are accessible only from within the network. By using a secure connection to a location inside the network, the security services manager 130 can bypass those firewalls or otherwise access restricted computing resources.

In one embodiment, some pre-configuration of the target network may be needed or desired for operating the security services. In one embodiment, the security services manager 130 provides one or more configuration files to the user for installation on the target network prior to the first access of the target network by the security services manager 130. Subsequent accesses by the security services manager 130 may be conducted without additional setup after the initial configuration.

At block 420, the security services manager 130 generates network security data by accessing the target network at the first location with the security computing node. This data can be generated by running various security programs on the security computing node, such as, for example, programs for URL manipulation, SQL injection, cross-site scripting, back-end authentication, password in memory, session hijacking, buffer overflow, web server configuration, credential management, Clickjacking, etc. Other tests or analysis that may be executed include: Day-to-Day threat analysis, unauthorized logins, personal information modification, pricelist modification, unauthorized funds transfer, breach of customer trust, as well as other security testing or monitoring procedures.

At block 425, the security services manager 130 optionally establishes a second secure connection from the security computing node to the target network. As discussed above, testing at multiple points on the target network can provide additional data or reveal additional vulnerabilities. For example, the target network may be composed of multiple subnetworks operating at multiple geographical locations. The subnetworks may be under the control of different departments within an organization with different levels of security implemented. By testing at the multiple locations of the target network, a better assessment of the security of the network can be generated. As will be apparent, the security services manager 130 may establish any number of additional secure connections to test the customer network at various locations.

In some embodiments, the same security computing node performs the testing at the different locations, sequentially or concurrently. Performing testing with the same computing node can provide testing consistency, as well as provide efficiencies by eliminating additional setup times in establishing additional security computing nodes. However, in other embodiments, multiple security computing nodes may be used, for example, where additional capacity or testing speed is needed or desired. Some tests may use multiple nodes, such as a simulation of denial of service attacks. The number of security computing nodes can scale based at least in part on the security service requested or the type of testing desired, etc.

In some embodiments, some security testing may be performed by security personnel (e.g., a security analyst) associated with the program execution service 100 or with a provider of security testing services or programs 355. As network vulnerabilities may take many forms, in particular as new types of vulnerabilities are found, testing by security personnel can provide a more thorough testing of the target network by better simulating attacks by hackers. In some embodiments, some testing, such as a standard testing suite, may be performed automatically by the security services manager 130 while advanced testing may be performed by the security personnel. Once the security services manager 130 completes its automated testing, it can hand off testing to the security personnel. In some embodiments, the security services manager 130 can provide, via email, web services, texts, or the like, the results of its standard testing to the security personnel, who can then use the results to identify vulnerabilities or potential vulnerabilities that may warrant further testing.

In some embodiments, the security services manager 130 testing can serve as a filter or a determination of whether testing by security personnel is needed or desired. As automated testing is generally cheaper than non-automated testing, using the security services manager 130 to make this determination can result in savings to the customer. For example, in some situations, multiple cycles or iterations of automated security testing may provide identical results and in those situations non-automated testing may not be desired as no new vulnerabilities or changes have been found. Thus, in one embodiment, security testing may be escalated to non-automated testing when or only when changes in the target network are detected.

At block 430, the security services manager 130 optionally generates additional network security data by accessing the target network at the second location with the same or different security node from block 420. This data can be generated by running various security programs on the same security computing node or another security computing node with access to the second location.

Optionally, the security services manager 130 may also conduct additional testing from outside the network. For example, the security services manager 130 can conduct tests without using secure connections to the inside of the network but rather conduct the tests from outside the network. This can be beneficial in testing the security infrastructure (e.g., firewalls) that filter or protect against intrusions from outside the network or otherwise testing how the target network performs from an outside intrusion. The security services manager 130 may also conduct tests of the publicly accessible portions of the target network, such as web or email servers.

At block 435, the security services manager 130 determines the security status of the target network based at least in part on the first and, optionally, on the second network data from the first and second location, respectively. Data from other locations on the target network as well as data from outside testing may also be used. In one embodiment, the security services manager 130 may generate an alert or other warning apprising customers of vulnerabilities that it found. In one embodiment, the results of the testing are provided to the user via email, via Web services, or via an interactive console or other GUI. After block 435, the routine can end.

As will be apparent, the systems and methods above can be modified in various ways. For example, other types of secure connection protocols than VPN protocols may be used. In some embodiments, other types of services in addition or instead of security services may be provided by the system. For example, network monitoring services for testing or monitoring network performance can be provided. Other variations and modifications to the systems and methods above are also possible.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for analyzing network security from a remote geographic location, the method comprising:
   accessing, by or more physical computing systems under control of a program execution service, a request from a user of a computing service to analyze a target network located at the remote geographic location from the computing service, the computing service comprising a plurality of computing nodes, the request received via a computing interface;
   automatically allocating, by the one or more physical computing systems, a computing node from the plurality of computing nodes of the computing service at the remote geographic location from the target network in response to the user's request, the computing node configured to analyze network security of the target network at the remote geographic location from the computing service;
   automatically establishing, by the one or more physical computing systems, a secure connection between the allocated computing node and a location within the target network, the secure connection providing the allocated computing node with network access to the target network at least substantially similar to network access provided to a computing node located at the location, the allocated computing node configured to gather network security data from the target network using the secure connection; and
   automatically determining, by the one or more physical computing systems, a security status of the target network based at least partly on the network security data gathered by the allocated computing node using the secure connection.

2. The method of claim 1, wherein the network access provided to the computing node through the secure connection is greater than network access provided to a computing node accessing the target network without a secure connection from outside the target network via the secure connection.

3. The method of claim 1, wherein determining the security status comprises generating network security data by accessing the target network from outside the target network.

4. The method of claim 1, wherein the network access is provided through a virtual private network.

5. The method of claim 1, wherein the computing node is associated with an internet protocol (IP) address within an IP address range used by the target network.

6. The method of claim 1, wherein the location within the target network is identified by an internet protocol (IP) address.

7. The method of claim 1, further comprising communicating a security status report comprising information related to vulnerabilities of the target network to the user.

8. The method of claim 1, further comprising communicating a security status report comprising information related to vulnerabilities of the target network to a security provider.

9. The method of claim 1, further comprising performing additional security testing of the target network based at least partly on the network security data.

10. The method of claim 1, wherein the computing node comprises a virtual machine instance.

11. The method of claim 1, further comprising dynamically allocating additional computing nodes based at least partly on the user request.

12. The method of claim 1, further comprising:
   metering the user's usage of the computing node configured to analyze network security; and
   billing the user based, at least partly, on the user's rated usage.

13. The method of claim 1, further comprising billing the user based on dynamically metered usage, wherein an amount of usage determines, at least in part, an amount billed to the user.

14. A system configured to manage requests for security testing of a target network, the system comprising:
   a computer memory configured to store one or more program modules for managing requests for security testing by a computing service, the computing service comprising a plurality of computing nodes; and
   a security services manager configured to communicate with the computer memory and to execute the one or more program modules stored in the computer memory, the security services manager implemented by a physical computing system, the program modules configured to:
      access, by the physical computing system, a request from a user of the computing service for security testing for a target network located at a remote geographic location from the computing service;
      automatically, by the physical computing system, allocate a computing node from the plurality of computing nodes of the computing service at the remote geographic location from the target network in response to the user's request, the computing node configured to analyze network security;
      automatically establish, by the physical computing system, one or more connections between the allocated computing node and one or more locations within the target network, the allocated computing node configured to gather network security data from the target network using the secure connection;
      and
      automatically determine, by the physical computing system, a security status of the target network based at least partly on the network security data gathered by the allocated computing node using the secure connection.

15. The system of claim 14, wherein the plurality of computing nodes of the computing service comprise one or more physical computing systems.

16. The system of claim 14, wherein the plurality of computing nodes comprise one or more virtual machine instances hosted on the one or more physical computing systems.

17. The system of claim 14, wherein the one or more virtual machine instances is instantiated from one of a plurality of virtual machine images provided by a plurality of security program providers.

18. The system of claim 17, wherein the request from the user includes a selection of a virtual machine image from the plurality of virtual machine images provided by the plurality of security program providers.

19. The system of claim 14, wherein the computing service provides an Application Programming Interface (API) for programmatically interacting with the computing service, and wherein the program modules are configured to receive the request from the user via the API.

20. The system of claim 14, wherein the security services manager is configured to connect to a network monitoring device located at least one of the one or more locations.

21. The system of claim 14, wherein the accessed request is a request stored for a period of time.

22. The system of claim 14, wherein the accessed request is a request received in substantially real-time.

23. A computer-implemented method for analyzing network security from a remote geographic location, the method comprising:
- accessing, by one or more physical computing systems under control of a program execution service, a request from a user of a computing service to analyze a target network located at the remote geographic location from the computing service, the computing service comprising a plurality of computing nodes, the request received via a computing interface;
- dynamically allocating, by the one or more physical computing systems, a computing node from the plurality of computing nodes of the computing service at the remote geographic location from the target network in response to the user's request, the computing node configured to analyze security of the target network at the remote geographic location from the computing service;
- automatically establishing, by the one or more physical computing systems, a first secure connection between the allocated computing node and a first location on the target network and the allocated computing node, the allocated computing node configured to gather network security data from the target network using the first secure connection;
- generating first network security data by accessing the target network at the first location with the allocated computing node through the first secure connection;
- automatically establishing, by the one or more physical computing systems, a second secure connection between the allocated computing node and a second location on the target network, wherein the allocated computing node is configured to gather network security data from the target network using the second secure connection, and wherein the second location is different from the first location;
- generating second network security data by accessing the target network at the second location with the allocated computing node through the second secure connection; and
- determining, by the one or more physical computing systems, a security status of the target network based at least partly on the first network data and second network data.

24. The method of claim 23, wherein the computing node operating on the first secure connection operates with network access at least substantially similar to a computing node located in the first location on the target network.

25. The method of claim 23, further comprising generating additional network security data with the computing node by establishing additional secure connections and wherein the security status of the target network is determined based at least partly on the additional network security data.

26. The method of claim 23, wherein the first location includes a first virtual private network server and the second location includes a second virtual private network server.

27. The method of claim 23, wherein the first secure connection comprises a first virtual private network and the second secure connection comprises a second virtual private network.

28. The method of claim 23, wherein computing interface comprises an Application Programming Interface (API) for programmatically interacting with the computing service and the request from the user is received via the API.

29. The method of claim 23, wherein the computing node comprises a virtual machine instance.

30. A non-transitory computer-readable medium having stored thereon instructions that, when executed by a computer system, cause the computer system to:
- access a request from a user of a computing service to analyze a target network located at a remote geographic location from the computing service, the computing service comprising a plurality of computing nodes;
- allocate one or more computing nodes from the plurality of computing nodes at the computing service in response to the user's request, the one or more computing nodes configured to analyze security of the target network;
- establish connections between the allocated one or more computing nodes and multiple locations inside the target network, the allocated one or more computing nodes configured to gather network security data from the target network using the secure connection; and
- determine a security status of the target network based at least partly on the network security data gathered by the allocated one or more computing nodes using the secure connection.

31. The computer-readable medium of claim 30, wherein the connections comprise virtual private network connections.

32. The computer-readable medium of claim 30, wherein the request includes network configuration data for the target network.

33. The computer-readable medium of claim 30, wherein the connections allow the one or more computing nodes to bypass a network filter of the target network.

* * * * *

UNITED STATES PATENT AND TRADEMARK OFFICE
CERTIFICATE OF CORRECTION

| | | |
|---|---|---|
| PATENT NO. | : 9,076,013 B1 | Page 1 of 1 |
| APPLICATION NO. | : 13/037265 | |
| DATED | : July 7, 2015 | |
| INVENTOR(S) | : Donald L. Bailey, Jr. et al. | |

It is certified that error appears in the above-identified patent and that said Letters Patent is hereby corrected as shown below:

IN THE CLAIMS

In column 13 at line 5, In Claim 1, after "by" insert --one--.

In column 14 at line 63, In Claim 20, after "located" insert --at--.

Signed and Sealed this
Eighth Day of March, 2016

Michelle K. Lee
*Director of the United States Patent and Trademark Office*